US012393143B2

(12) United States Patent
Shimura

(10) Patent No.: US 12,393,143 B2
(45) Date of Patent: *Aug. 19, 2025

(54) HEATER AND IMAGE HEATING DEVICE MOUNTED WITH HEATER

(71) Applicant: CANON KABUSHIKI KAISHA, Tokyo (JP)

(72) Inventor: Yasuhiro Shimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,016

(22) Filed: Sep. 5, 2023

(65) Prior Publication Data

US 2023/0408957 A1 Dec. 21, 2023

Related U.S. Application Data

(63) Continuation of application No. 17/872,486, filed on Jul. 25, 2022, now Pat. No. 11,782,366, which is a continuation of application No. 17/366,811, filed on Jul. 2, 2021, now Pat. No. 11,422,491, which is a continuation of application No. 16/581,079, filed on Sep. 24, 2019, now Pat. No. 11,079,705, which is a continuation of application No. 14/944,076, filed on Nov. 17, 2015, now Pat. No. 10,459,379, which is a (Continued)

(30) Foreign Application Priority Data

Sep. 19, 2012 (JP) ................................ 2012-205713

(51) Int. Cl.

| | |
|---|---|
| ***G03G 15/20*** | (2006.01) |
| ***H05B 3/03*** | (2006.01) |
| ***H05B 3/26*** | (2006.01) |

(52) U.S. Cl.

CPC ..... *G03G 15/2039* (2013.01); *G03G 15/2003* (2013.01); *G03G 15/2042* (2013.01); *G03G 15/2053* (2013.01); *H05B 3/03* (2013.01); *G03G 2215/2035* (2013.01); *H05B 3/26* (2013.01); *H05B 2203/007* (2013.01); *H05B 2203/02* (2013.01)

(58) Field of Classification Search

CPC ........... G03G 15/2039; G03G 15/2003; G03G 15/2042; G03G 15/2053; G03G 2215/2035; H05B 3/03; H05B 3/26; H05B 2203/007; H05B 2203/02

See application file for complete search history.

(56) References Cited

U.S. PATENT DOCUMENTS 9,235,166 B2 * 1/2016 Shimura ............ G03G 15/2053
11,079,705 B2 * 8/2021 Shimura ............ G03G 15/2053

(Continued)

*Primary Examiner* — Sandra Brase

(74) *Attorney, Agent, or Firm* — Canon U.S.A., Inc. IP Division

(57) ABSTRACT

A heater of the present invention includes jointed heat generating resistors having a positive temperature characteristic of resistance and provided between a first conductive element and a second conductive element on a substrate in a longitudinal direction of the substrate, and a plurality of heating blocks provided in the longitudinal direction, each of which is a set of the first conductive element, the second conductive element, and the heat generating resistor, and power supplied to at least one of the plurality of heating blocks can be controlled independent of other heating blocks.

19 Claims, 12 Drawing Sheets

Related U.S. Application Data continuation of application No. 14/029,619, filed on Sep. 17, 2013, now Pat. No. 9,235,166.

(56) References Cited

U.S. PATENT DOCUMENTS

| | | | | |
|---|---|---|---|---|
| 11,422,491 | B2 * | 8/2022 | Shimura | H05B 3/03 |
| 11,782,366 | B2 * | 10/2023 | Shimura | G03G 15/2003 399/69 |
| 2004/0256372 | A1 * | 12/2004 | Yoshioka | G03G 15/2042 219/470 |
| 2006/0051118 | A1 * | 3/2006 | Kaji | G03G 15/2039 399/69 |
| 2011/0062140 | A1 * | 3/2011 | Sakakibara | G03G 15/2053 219/539 |

* cited by examiner

HEATER AND IMAGE HEATING DEVICE MOUNTED WITH HEATER

CROSS-REFERENCE TO RELATED APPLICATION

This application is a Continuation of U.S. application Ser. No. 17/872,486, filed on Jul. 25, 2022, which is a Continuation of U.S. application Ser. No. 17/366,811, filed on Jul. 2, 2021 and issued as U.S. Pat. No. 11,422,491 on Aug. 23, 2022, which is a Continuation of U.S. application Ser. No. 16/581,079, filed on Sep. 24, 2019 and issued as U.S. Pat. No. 11,079,705 on Aug. 3, 2021, which is a Continuation of U.S. application Ser. No. 14/944,076, filed on Nov. 17, 2015 and issued as U.S. Pat. No. 10,459,379 on Oct. 29, 2019, which is a Continuation of U.S. application Ser. No. 14/029,619, filed on Sep. 17, 2013 and issued as U.S. Pat. No. 9,235,166 on Jan. 12, 2016, which claims priority from Japanese Patent Application No. 2012-205713, filed on Sep. 19, 2012, all of which are hereby incorporated by reference herein in their entireties.

BACKGROUND OF THE INVENTION

Field of the Invention

The present invention relates to a heater useful for an image heating device mounted on an image forming apparatus such as an electrophotographic copier or an electrophotographic printer, and an image heating device mounting the heater.

Description of the Related Art

An image heating device mounted on a copier or a printer includes an endless belt, a ceramic heater which contacts the inner surface of the endless belt, and a pressure roller which forms a fixing nip portion with the ceramic heater via the endless belt. If small size paper is continuously printed by an image forming apparatus which is mounted with such an image heating device, the temperature of a non-paper-passing portion in the longitudinal direction of the fixing nip portion gradually increases (temperature rise at non-sheet-passing portion). If the temperature of the non-sheet-passing portion becomes too high, it may cause damage to the components of the apparatus. Further, if large size paper is printed in a state where the temperature at the non-sheet-passing portion is high, high temperature offset of toner may occur at the area corresponding to the non-sheet-passing portion of small size paper.

As one method for preventing such temperature rise at the non-sheet-passing portion, Japanese Patent Application Laid-Open No. 2011-151003 discusses a method which uses two conductive elements and a heat generating resistor formed by a material having a positive temperature characteristic of resistance. The heat generating resistor is mounted on a ceramic substrate and the two conductive elements are arranged at both ends of the substrate in the widthwise direction of the substrate so that the current passes the heat generating resistor in the widthwise direction of the heater. The widthwise direction of the heater is the conveying direction of the paper. This flow of current is hereinafter referred to as power feeding in the paper conveying direction. The resistance of the heat generating resistor at the non-sheet-passing portion increases when the temperature of the non-sheet-passing portion increases. Thus, the heat generation at the non-sheet-passing portion can be decreased by reducing the electric current that passes through the heat generating resistor at the non-sheet-passing portion. The resistance of a device having the positive temperature characteristic of resistance increases when the temperature increases. Such characteristic is hereinafter referred to as positive temperature coefficient (PTC).

However, even if a heater configured as described above is used, the electric current flows through the heat generating resistor positioned at the non-sheet-passing portion and heat is generated.

SUMMARY OF THE INVENTION

The present invention is directed to providing a heater which can effectively prevent temperature rise at a non-sheet-passing portion. The present invention is directed to providing an image heating device mounted with a heater which can effectively prevent temperature rise at a non-sheet-passing portion.

According to an aspect of the present invention, a heater includes a substrate, a first conductive element provided on the substrate along a longitudinal direction of the substrate, a second conductive element provided on the substrate along the longitudinal direction at a position different from the first conductive element in a widthwise direction of the substrate, and a heat generating resistor provided between the first conductive element and the second conductive element and showing a positive temperature characteristic of resistance, which generates heat when power is supplied via the first conductive element and the second conductive element, and a plurality of heating blocks each of which includes a set of the first conductive element, the second conductive element, and the heat generating resistor is provided in the longitudinal direction, and power control of at least one of the plurality of heating blocks can be performed independent of other heating blocks, and according to another aspect of the present invention, an image heating device includes a heater, a connector connected to an electrode of the heater and configured to supply power to the heater, and the heater includes, a substrate, a first conductive element provided on the substrate along a longitudinal direction of the substrate, a second conductive element provided on the substrate along the longitudinal direction at a position different from the first conductive element in a widthwise direction of the substrate, and a heat generating resistor provided between the first conductive element and the second conductive element and including a positive temperature characteristic of resistance associated with heat generation when power is supplied via the first conductive element and the second conductive element, and a plurality of heating blocks each of which includes a set of the first conductive element, the second conductive element, and the heat generating resistor which is provided in the longitudinal direction, and power control of at least one of the plurality of heating blocks can be performed independent of other heating blocks.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
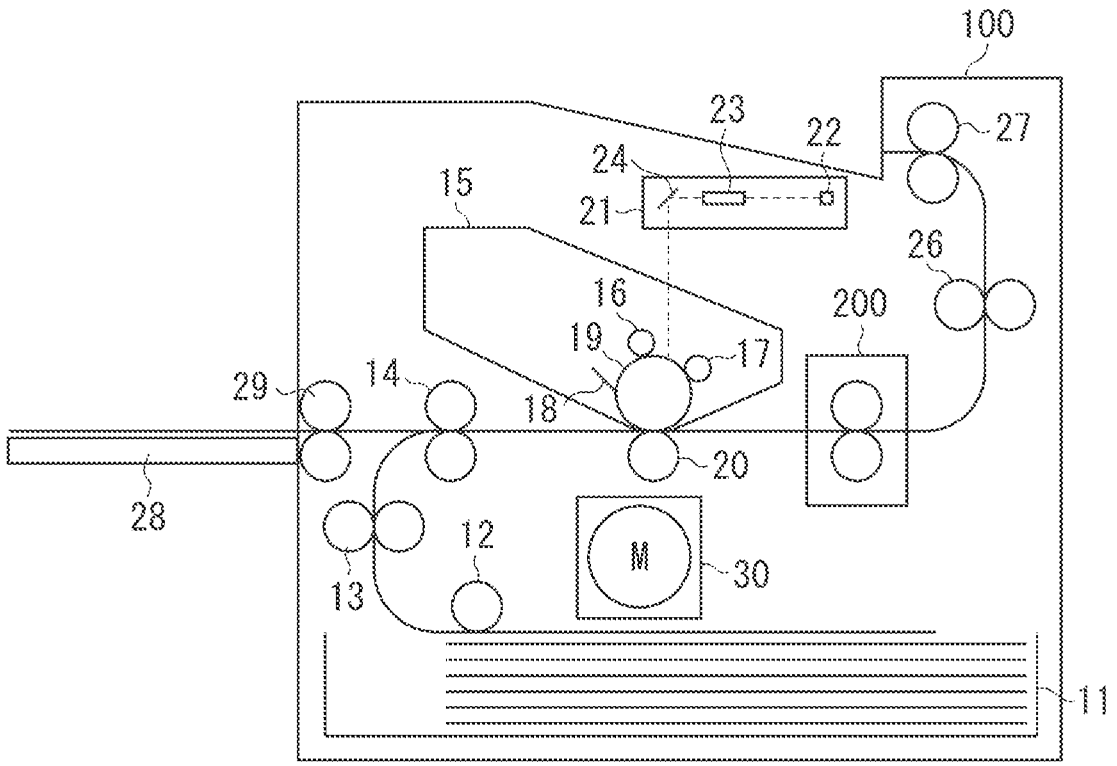
FIG. 1 is a cross-sectional view of an image forming apparatus.

FIG. 1 is a cross-sectional view of a laser printer (image forming apparatus) 100 using an electrophotographic recording technique. When a print signal is generated, a laser beam is emitted from a scanner unit 21. The laser beam is modulated according to image information. A photosensitive member 19, which is charged to a predetermined polarity by a charge roller 16, is scanned by the laser beam. Accordingly, an electrostatic latent image is formed on the photosensitive member 19. Toner is supplied to this electrostatic latent image from a developing unit 17 and a toner image is formed on the photosensitive member 19 according to the image information. On the other hand, a recording material (recording paper) P, set in a sheet cassette 11, is picked-up by a pickup roller 12 one sheet at a time, and conveyed to a registration roller 14 by a roller 13. Further, the recording material P is conveyed to a transfer position by the registration roller 14 at timing the toner image on the photosensitive member 19 reaches the transfer position. The transfer position is formed by the photosensitive member 19 and a transfer roller 20.

The toner image on the photosensitive member 19 is transferred to the recording material P while the recording material P passes the transfer position. Then, heat is applied to the recording material P by an image heating device 200 and the toner image is fixed to the recording material P. The recording material P with the fixed toner image is discharged on a tray provided at the upper portion of the printer by rollers 26 and 27. The laser printer 100 also includes a cleaner 18 which cleans the photosensitive member 19 and a paper feeding tray 28 which is a manual feed tray having a pair of regulating plates. The user can adjust the width of the paper feeding tray 28 to the size of the recording material P by using the pair of regulating plates. The paper feeding tray 28 is used when the recording material P of a size other than the standard size is printed. A pick up roller 29 picks up the recording material P from the paper feeding tray 28. A motor 30 drives the image heating device 200. The photosensitive member 19, the charge roller 16, the scanner unit 21, the developing unit 17, and the transfer roller 20 constitute an image forming unit which forms an unfixed image on the recording material P.

The laser printer 100 according to the present embodiment can print an image on paper of various sizes. In other words, the laser printer 100 can print an image on Letter paper (approximately 216 mm×279 mm), Legal paper (approximately 216 mm×356 mm), A4 paper (210 mm×297 mm), Executive paper (approximately 184 mm×267 mm), JIS B5 paper (182 mm×257 mm), and A5 paper (148 mm×210 mm) set in the sheet cassette 11.

Further, the laser printer 100 can print an image on non-standard paper such as a DL envelope (110 mm×220 mm) and a Com10 envelope (approximately 105 mm×241 mm) set in the paper feeding tray 28. Basically, the laser printer 100 is a printer which feeds paper by short edge feeding. When the paper is fed by short edge feeding, the long side of the sheet is in parallel with the sheet-conveying direction. The largest size of paper (i.e., paper with the largest width) out of the standard paper sizes printable by the laser printer 100 according to the apparatus brochure is Letter paper and Legal paper with a width of approximately 216 mm. According to the present embodiment, paper with a width smaller than the largest size printable by the laser printer 100 is referred to as small size paper.

Figure 2:
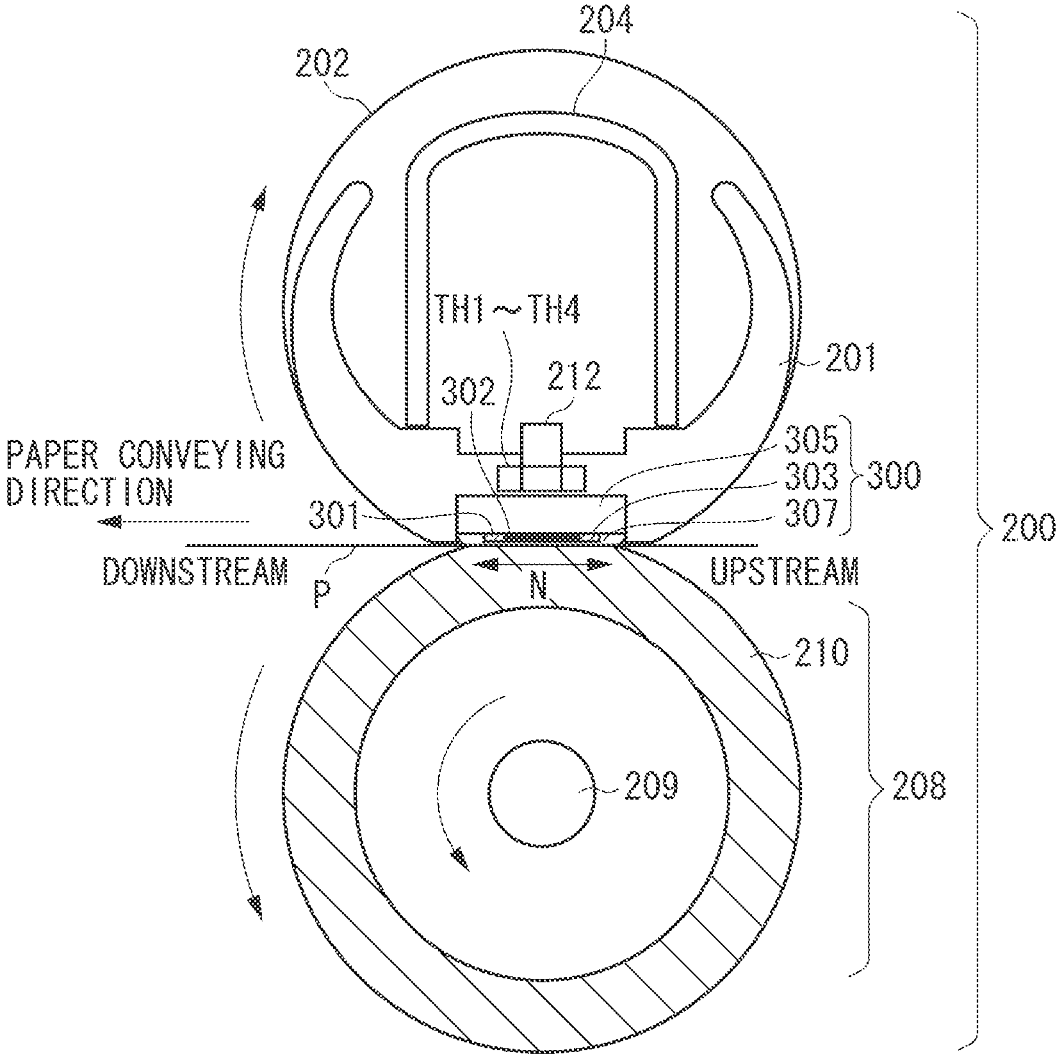
FIG. 2 is a cross-sectional view of an image heating device according to a first exemplary embodiment of the present invention.

FIG. 2 is a cross-sectional view of the image heating device 200. The image heating device 200 includes a film 202, a heater 300, and a pressure roller 208. The film 202 is an endless belt. The heater 300 contacts the inner side of the film 202. The pressure roller 208 forms a nip portion forming member which forms a fixing nip portion N via the film 202 together with the heater 300. The material of the base layer of the film 202 is a heat-resistant resin such as a polyimide or a metal such as stainless steel. The pressure roller 208 includes a cored bar 209 made of steel or aluminum, and an elastic layer 210 formed by a material such as a silicone rubber. The heater 300 is held by a holding member 201 which is made of a heat resistant resin. The holding member 201 has a guiding function and it guides the rotation of the film 202. When the pressure roller 208 receives power from the motor 30, it rotates in the direction of the arrow. Further, the film 202 rotates following the rotation of the pressure roller 208. At the fixing nip portion N, heat is applied to the recording material P. Thus, the unfixed toner image is fixed to the recording material P while the recording material P is conveyed through the fixing nip portion N.

The heater 300 includes a heater substrate 305 which is ceramic, a first conductive element 301, and a second conductive element 303. The first conductive element 301 is provided on the heater substrate 305 along the longitudinal direction of the substrate. The second conductive element 303 is also provided on the heater substrate 305 along the longitudinal direction of the substrate but at a position different from the first conductive element 301 in the widthwise direction of the substrate. Further, the heater 300 includes a heat generating resistor 302. The heat generating resistor 302 is provided between the first conductive element 301 and the second conductive element 303 and has a positive temperature characteristic of resistance. The heat generating resistor 302 generates heat according to the power supplied via the first conductive element 301 and the second conductive element 303. Furthermore, the heater 300 includes a surface protection layer 307 which covers the heat generating resistor 302, the first conductive element 301, and the second conductive element 303. The surface protection layer 307 has an insulation property. According to the present embodiment, glass is used for the surface protection layer 307. As temperature detecting elements, thermistors TH1, TH2, TH3, and TH4 contact the back side of the heater substrate 305 in the sheet-passing area of the laser printer 100. In addition to the thermistors TH1 to TH4, a safety element 212 also contacts the back side of the heater substrate 305. The safety element 212 is, for example, a thermo switch or a thermal fuse. When abnormal heating of the heater occurs, the safety element 212 is turned on and the power supplied to the heater is stopped. A metal stay 204 exerts a force of a spring (not illustrated) on the holding member 201.

Figure 3A:
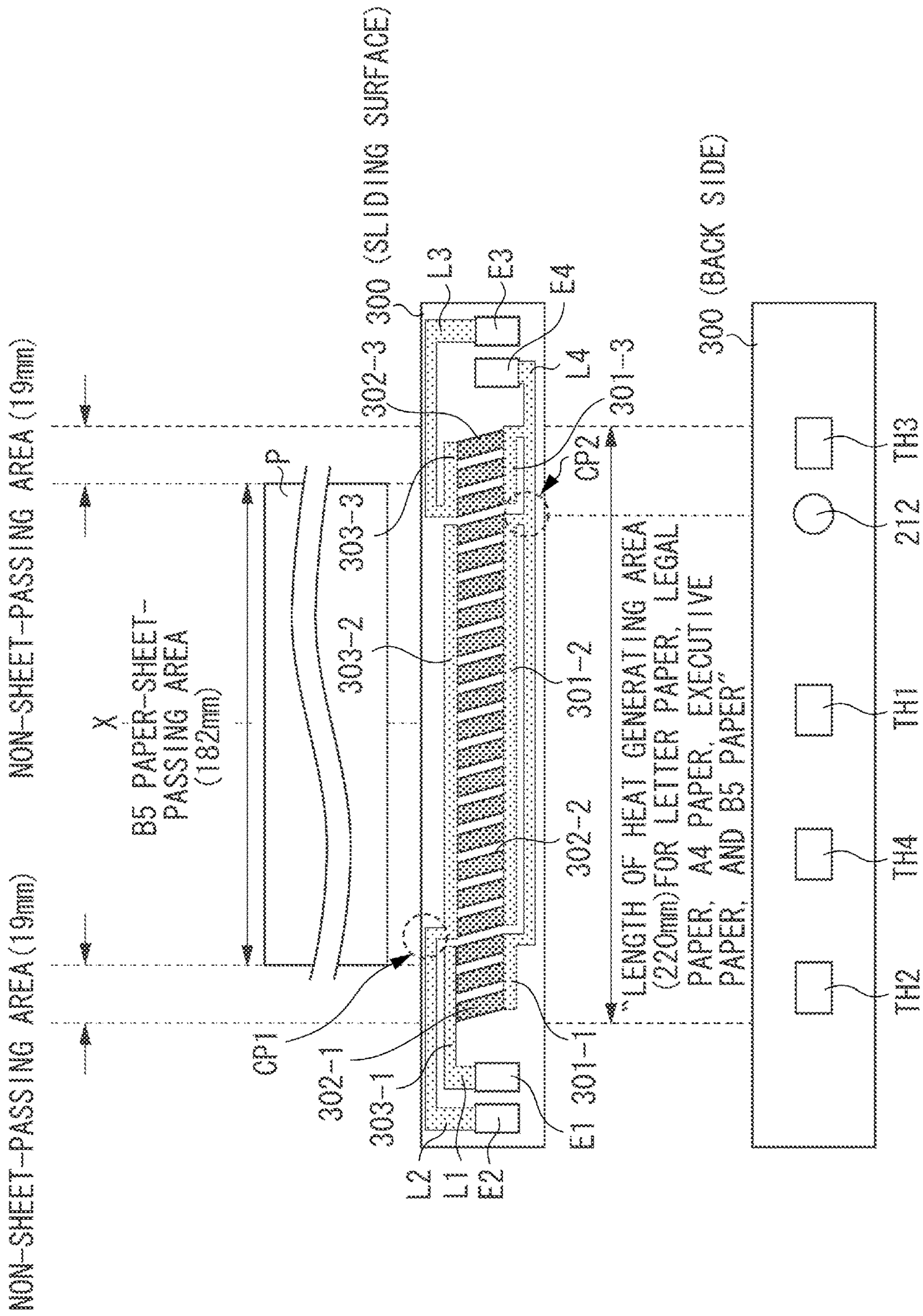
FIGS. 3A and 3B illustrate configurations of a heater according to the first exemplary embodiment.
Figure 3B:
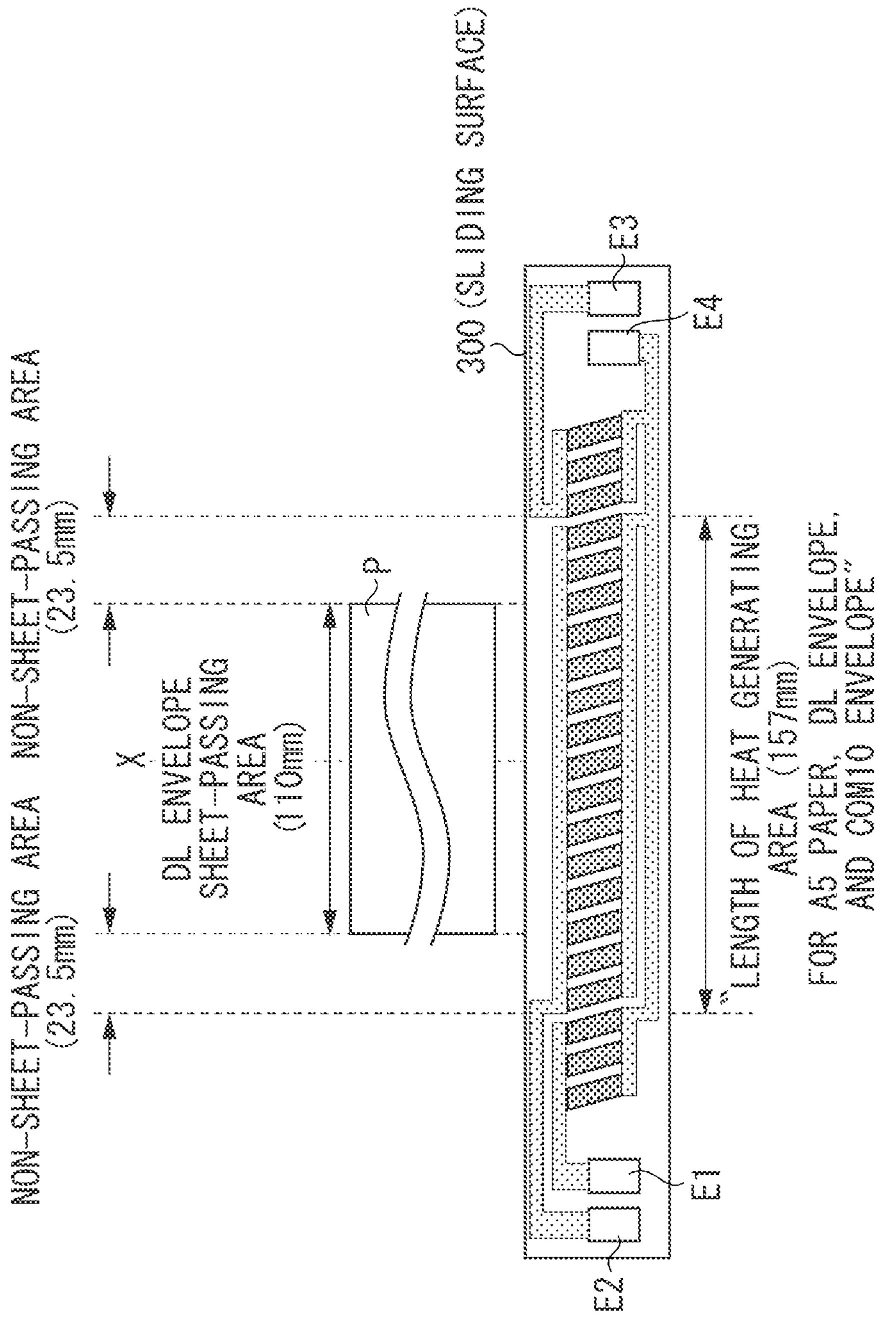

FIGS. 3A and 3B illustrate heater configurations of a first exemplary embodiment. First, the configuration of the heater and the effect of reducing the temperature rise at the non-sheet-passing portion will be described with reference to FIG. 3A.

The heater 300 includes a plurality of heating blocks in the longitudinal direction of the substrate. One heating block is a set of components which are the first conductive element 301, the second conductive element 303, and the heat generating resistor 302. The heater 300 according to the present embodiment includes a total of three heating blocks (a heating block 302-1, a heating block 302-2, a heating block 302-3) provided at the center and both ends of the heater 300 in the longitudinal direction of the substrate. Thus, the first conductive element 301 provided along the longitudinal direction of the substrate is divided into three conductive elements (first conductive elements 301-1, 301-2, and 301-3). Similarly, the second conductive element 303 provided along the longitudinal direction of the substrate is divided into three conductive elements (second conductive elements 303-1, 303-2, and 303-3). Connectors for power supply provided on the main body side of the image heating device 200 are connected to electrodes E1, E2, E3, and E4.

The heating block 302-1, which is arranged at one end of the heater 300, includes a plurality of heat generating resistors (three heat generating resistors according to the present embodiment) between the first conductive element 301-1 and the second conductive element 303-1. The heat generating resistors are electrically connected by parallel connection. The three heat generating resistors of the heating block 302-1 receive power from the electrode E1 and the electrode E4 via the first conductive element 301-1 and the second conductive element 303-1.

The heating block 302-2, which is at the center portion of the heater 300, includes a plurality of heat generating resistors (15 heat generating resistors according to the present embodiment) between the first conductive element 301-2 and the second conductive element 303-2. The heat generating resistors are electrically connected by parallel connection. The 15 heat generating resistors of the heating block 302-2 receive power from the electrode E2 and the electrode E4 via the first conductive element 301-2 and the second conductive element 303-2.

The heating block 302-3, which is at the other end of the heater 300, includes a plurality of heat generating resistors (three heat generating resistors according to the present embodiment) between the first conductive element 301-3 and the second conductive element 303-3. The heat generating resistors are electrically connected by parallel connection. The three heat generating resistors of the heating block 302-3 receive power from the electrode E3 and the electrode E4 via the first conductive element 301-3 and the second conductive element 303-3. Each of a total of 21 heat generating resistors has a positive temperature characteristic of resistance (PTC).

In this manner, a plurality of heating blocks, each of which is a set of components (the first conductive element 301, the second conductive element 303, and the heat generating resistor 302), are provided in the heater 300 in the longitudinal direction of the substrate. The heating blocks are configured such that power control of at least one of them can be performed independently from the power control of other heating blocks.

According to the present embodiment, by devising the connection positions of the conductive elements and power supply lines (L1 to L4) which extend from the electrodes (E1 to E4), uniform heat distribution of the heater 300 in the longitudinal direction of the substrate can be realized. More precisely, with respect to each of the three heating blocks, power is supplied from the diagonal side of the heating block. This power feeding method is hereinafter referred to as diagonal power feeding.

The diagonal power feeding will now be described by taking the heating block 302-2 as an example. In FIG. 3A, power is supplied in a diagonal direction of the heating block from a connection position CP2 and a connection position CP1. The connection position CP2 is a connection position of the first conductive element 301-2 and the power supply line L4 at the lower right portion of the heating block 302-2. The connection position CP1 is a connection position of the second conductive element 303-2 and the power supply line L2 at the upper left portion of the heating block 302-2. Thus, the connection positions CP1 and CP2 are set at opposed positions in the longitudinal direction of the substrate. In other words, the connection positions of the first conductive element 301-2 and the second conductive element 303-2 of the heating block 302-2 with the power supply lines that extend from the electrode E2 and the electrode E4 are arranged at opposed positions in the longitudinal direction of the substrate.

According to the present embodiment, as illustrated in FIG. 3A, power is supplied to all of the three heating blocks by the diagonal power feeding. However, even if power is supplied to at least one heating block out of the three heating blocks by the diagonal power feeding, uneven heat distribution can be reduced.

If power is supplied without using the diagonal power feeding from the lower right portion of the conductive element 301-2 of the heating block 302-2 and from the upper right portion of the conductive element 303-2 of the heating block 302-2 (see FIG. 3A), voltage drop occurs on the left side of the heating block 302-2 owing to the effect of the resistance value of the conductive element. Thus, the amount of heat generation on the left side of the heating block 302-2 will be reduced.

Further, according to the present embodiment, the positions of the plurality of heat generating resistors which are parallelly connected are slanted with respect to the longitudinal direction and the widthwise direction of the substrate such that adjacent heat generating resistors overlap with each other in the longitudinal direction. In this manner, the effect of the gap portions between the plurality of heat generating resistors is reduced and uniformity regarding the heat distribution in the longitudinal direction of the heater 300 can be improved. Further, according to the heater 300 of the present embodiment, regarding the gap portions of the plurality of heating blocks, since the heat generating resistors at the end portions of the adjacent heating blocks overlap in the longitudinal direction, uniformity regarding the heat distribution can be furthermore improved.

As described above, the thermistors TH1 to TH4, which are temperature detecting elements, and the safety element 212 contact the back side of the heater 300. The power control of the heater 300 is based on the output of the thermistor TH1 provided near the center of the sheet-passing portion (near a conveyance reference position X described below). The thermistor TH4 detects the temperature at the end portion of the heat generating area of the heating block 302-2 (the state in FIG. 3B). Further, the thermistor TH2 detects the temperature at the end portion of the heat generating area of the heating block 302-1 (the state in FIG. 3A) and the thermistor TH3 detects the temperature at the end portion of the heat generating area of the heating block 302-3 (the state in FIG. 3A).

According to the laser printer 100 of the present embodiment, one or more thermistors are provided on each of the three heating blocks so that if power is supplied only to a single heating block due to, for example, device failure, such a state can be detected. Thus, the safety of the apparatus can be enhanced.

The safety element 212 is arranged in such a manner that it can operate in different states. Namely, the safety element 212 can operate in a state where power is supplied only to the heating block 302-2 at the center portion of the heater 300 as illustrated in FIG. 3B. Further, the safety element 212 can operate in a state where power is supplied only to the heating blocks 302-1 and 302-3 on the ends of the heater 300 due to, for example, device failure. In other words, the safety element 212 is provided at a position between the heating block 302-2 at the center portion and either of the heating blocks 302-1 and 302-3. The safety element 212 is turned on when abnormal heating of the heater 300 occurs so that power supplied to the heater 300 is stopped.

Next, temperature rise at the non-sheet-passing portion when power is supplied to all the three heating blocks 302-1, 302-2, and 302-3 will be described with reference to FIG. 3A. The center of the heat generating area is set as a reference position and B5 paper is fed by short edge feeding. The reference position when paper is conveyed is defined as the conveyance reference position X of a recording material (paper).

The sheet cassette 11 includes a position regulating plate which regulates the position of the paper. The recording material P is fed from a predetermined position of the sheet cassette 11 according to the size of the recording material P which is loaded and conveyed to pass a predetermined portion of the image heating device 200. Similarly, the paper feeding tray 28 includes a position regulating plate which regulates the position of the paper. The recording material P is fed from the paper feeding tray 28 and conveyed to pass a predetermined portion of the image heating device 200.

The heater 300 has a heat generating area of a length of 220 mm which enables short edge feeding of Letter paper with a width of approximately 216 mm. If B5 paper with a paper width of 182 mm is fed to the heater 300 having a heat generating area of a length of 220 mm, a non-sheet-passing area of 19 mm is generated at both ends of the heat generating area. Although the power supplied to the heater 300 is controlled so that the temperature detected by the thermistor TH1 provided near the center of the sheet-passing portion is continuously the target temperature, since the heat generated at the non-sheet-passing portion is not removed by paper, the temperature of the non-sheet-passing portion is increased compared to the sheet-passing portion.

As illustrated in FIG. 3A, in printing B5-size paper, the sides of the recording material passes a part of the heating blocks 302-1 and 302-3 at both ends of the heater 300. Thus, a non-sheet-passing portion of 19 mm is generated at both ends of the heating blocks 302-1 and 302-3. However, since the heat generating resistor is a PTC material, the resistance of the heat generating resistor at the non-sheet-passing portion will be higher than the resistance of the heat generating resistor at the sheet-passing portion, so that the current flows less easily. According to this principle, the temperature rise at the non-sheet-passing portion can be reduced.

The temperature rise at the non-sheet-passing portion when power is supplied only to the heating block 302-2 at the center portion of the heater 300 will be described with reference to FIG. 3B. In FIG. 3B, the center of the heat generating area is set as the reference position and a DL-size envelope with a width of 110 mm is fed by short edge feeding. The length of the heat generating area of the heating block 302-2 of the heater 300 is 157 mm which enables short edge feeding of A5 paper which has a width of approximately 148 mm. If a DL size envelope, which has a width of 110 mm, is fed to the heater 300 provided with the heating block 302-2, which has a length of 157 mm, by short edge feeding, a non-sheet-passing area of 23.5 mm is generated at each end of the heating block 302-2 at the center portion. The heater 300 is controlled based on the output of the thermistor TH1 provided at about the center of the sheet-passing portion. Since, the heat generated at the non-sheet-passing portion is not removed by paper, the temperature of the non-sheet-passing portion is increased compared to the sheet-passing portion.

In the state illustrated in FIG. 3B, by supplying power only to the heating block 302-2, the length of the non-sheet-passing area can be reduced. Generally, the longer the non-sheet-passing portion area is, the more the temperature increases at the non-sheet-passing portion. Thus, the temperature rise at the non-sheet-passing portion may not be satisfactorily controlled if the control is performed depending only on the effect of power feeding to the heat generating resistor, which is a PTC material, in the paper conveying direction. Thus, as illustrated in FIG. 3B, the length of the non-sheet-passing area is reduced. Further, the temperature rise in the non-sheet-passing area of 23.5 mm at each end of the heating block 302-2 can be reduced by a principle same as the one described with reference to FIG. 3A.

Figure 4:
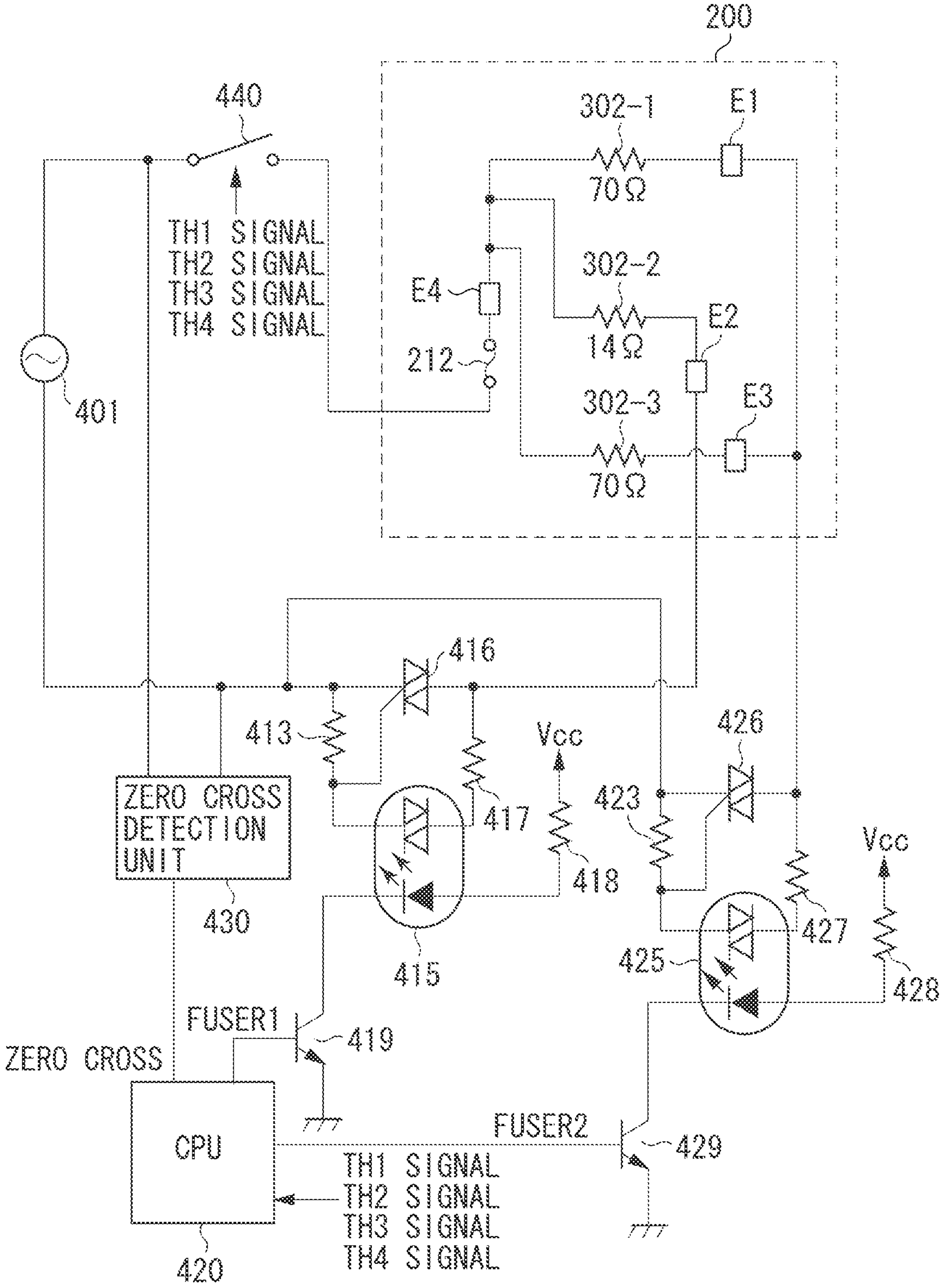
FIG. 4 is a heater control circuit diagram according to the first exemplary embodiment.

FIG. 4 is a heater control circuit diagram according to the first exemplary embodiment. An AC power supply 401 is a commercial power supply connected to the laser printer 100. The power supplied to the heater 300 is controlled by power on/off of a triac 416 and a triac 426. The power to the heater 300 is supplied via the electrodes E1 to E4. According to the present embodiment, the resistance values of the heating blocks 302-1, 302-2, and 302-3 are 70 ohms, 14 ohms, and 70 ohms, respectively.

A zero cross detection unit 430 detects zero-crossing of the AC power supply 401 and outputs a zero-cross signal to a central processing unit (CPU) 420. The zero-cross signal is used for controlling the heater 300. For example, if the temperature of the heater 300 excessively increases due to some failure, a relay 440 operates according to a signal output from the thermistors TH1 to TH4 and stops the power to the heater 300.

Next, the operation of the triac 416 will be described. Resistors 413 and 417 are bias resistors for the triac 416. A phototriac coupler 415 is provided so that creepage distance is maintained between primary and secondary circuits. The triac 416 is turned on when a light emitting diode of the phototriac coupler 415 is energized. A resistor 418 limits the electric current of the light emitting diode of the phototriac coupler 415. The phototriac coupler 415 is turned on/off by a transistor 419. The transistor 419 operates according to a signal (FUSER1) output from the CPU 420.

When the triac 416 is energized, power is supplied to the heating block 302-2 of the resistance value of 14 ohms. When the power is controlled so that the energizing ratio of the triac 416 and the triac 426 is 1:0, power is supplied only to the heating block 302-2. FIG. 3B illustrates the heater 300 in this state.

Since the circuit operation of the triac 426 is similar to the operation of the triac 416, it is not described. The triac 426 operates according to a signal (FUSER2) output from the CPU 420. When the triac 426 is energized, power is supplied to the heating block 302-1 (70 ohms) and the heating block 302-3 (70 ohms). Since these two heating blocks are parallelly-connected, power is supplied to a resistance of 35 ohms.

In the state illustrated in FIG. 3A, power is supplied via the triacs 416 and 426. In other words, when the triacs 416 and 426 are energized, power is supplied to the heating block 302-1 (70 ohms), the heating block 302-2 (14 ohms), and the heating block 302-3 (70 ohms). Since these three heating blocks are parallelly-connected, power is supplied to a resistance of 10 ohms. When the power is controlled so that the energizing ratio of the triac 416 and the triac 426 is 1:1, the heater 300 will be in the state described with reference to FIG. 3A.

The total resistance of the heater 300 is set to such a value that the power necessary for fixing a recording material with a largest paper width which can be printed by the laser printer 100 (Letter paper or Legal paper according to the present embodiment) is ensured. In other words, when power is supplied to all of the three heating blocks 302-1 to 302-3 as illustrated in FIG. 3A, the total resistance value will be 10 ohms.

According to the present embodiment, since the heating blocks 302-1 and 302-3 at both ends of the heater 300 and the heating block 302-2 at the center are parallelly-connected, the total resistance value is 14 ohms in a state where power is supplied only to the center of the heating block 302-2 as illustrated in FIG. 3B. This is higher than the total resistance value of 10 ohms in a state where power is supplied to all of the three heating blocks as illustrated in FIG. 3A. Thus, compared to the state illustrated in FIG. 3A, the heater 300 in the state illustrated in FIG. 3B is furthermore advantageous with respect to harmonic, flicker, and heater protection (generally, the lower resistance value, the adversely these items are affected). In contrast, if the three heating blocks 302-1 to 302-3 are series-connected and power is supplied only to the heating block 302-2 at the center portion of the heater 300, since the total resistance value of the heater is reduced, it is disadvantageous with respect to, for example, harmonic. Accordingly, designing the heater will become difficult.

The temperature detected by the thermistor TH1 is detected by the CPU 420 as a signal of the TH1 with voltage divided using resistors (not illustrated). The temperatures of the thermistors TH2 to TH4 are detected by the CPU 420 by a similar method. Based on the temperature detected by the thermistor TH1 and the temperature set to the heater 300, the CPU 420 (control unit) calculates the power to be supplied through internal processing such as proportional integral (PI) control. Further, the CPU 420 converts it to a control level of a phase angle (phase control) or a wave number (wave number control) which corresponds to the power to be supplied. Then, the CPU 420 controls the triac 416 and the triac 426 according to the control level.

Figure 5:
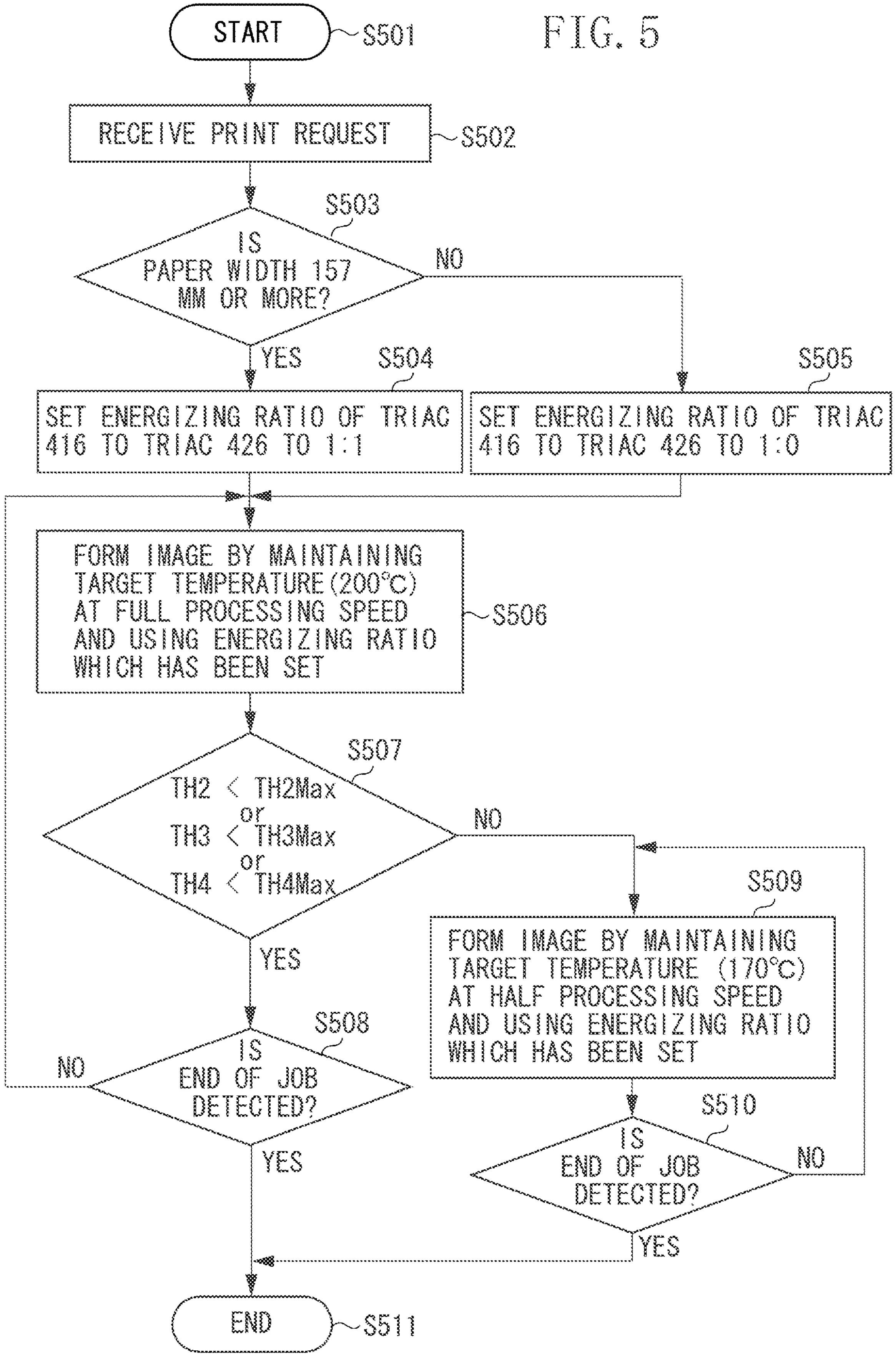
FIG. 5 is a flowchart illustrating the heater control according to the first exemplary embodiment.

FIG. 5 is a flowchart illustrating a control sequence of the image heating device 200 performed by the CPU 420. In step S502, the CPU 420 receives a print request. In step S503, the CPU 420 determines whether the width of the paper to be printed is 157 mm or more. According to the laser printer 100 of the present embodiment, the CPU 420 determines whether the paper is Letter paper, Legal paper, A4 paper, Executive paper, B5 paper, or non-standard paper with a width of 157 mm or more and fed from the paper feeding tray 28. If the CPU 420 determines that the paper is such paper (YES in step S503), the processing proceeds to step S504. In step S504, the CPU 420 sets the energizing ratio of the triac 416 to the triac 426 to 1:1 (the state in FIG. 3A).

If the paper width is less than 157 mm (according to the present embodiment, A5 paper, DL envelope, Com10 envelope, or non-standard paper with a width less than 157 mm) (NO in step S503), the processing proceeds to step S505. In step S505, the CPU 420 sets the energizing ratio of the triac 416 to the triac 426 to 1:0 (the state in FIG. 3B).

In step S506, by using the energizing ratio which has been set, the CPU 420 performs the fixing processing while setting the image forming process speed to full speed (1/1 speed) and controlling the heater 300 so that the temperature detected by the thermistor TH1 is continuously the target preset temperature (200° C.)

In step S507, the CPU 420 determines whether the temperature of the thermistor TH2 has exceeded a maximum temperature TH2Max of the thermistor TH2, the temperature of the thermistor TH3 has exceeded a maximum temperature TH3Max of the thermistor TH3, and the temperature of the thermistor TH4 has exceeded a maximum temperature TH4Max of the thermistor TH4. The maximum temperatures are set to the CPU 420 in advance. If the CPU 420 determines that any of the temperatures at the end portions of the heat generating area has exceeded the predetermined upper limit (the maximum temperatures TH2Max, TH3Max, or TH4Max) due to the increase in the temperature of the non-sheet-passing portion based on the signals of the thermistors TH2 to TH4 (NO in step S507), the processing proceeds to step S509. In step S509, the CPU 420 performs the fixing processing while setting the image forming process speed to half speed (½ speed) and controlling the heater 300 so that the temperature detected by the thermistor TH1 is continuously the target preset temperature (170° C.). If the image forming process speed is reduced to half, since good fixing can be obtained even at a low temperature, the fixing target temperature can be reduced and the increase in temperature at the non-sheet-passing portion can be reduced.

In step S508, the CPU 420 determines whether the end of the print job has been detected. If the end of the print job has been detected (YES in step S508), the control sequence of the image forming ends. If the end of the print job has not yet been detected (NO in step S508), the processing returns to step S506. In step S510, the CPU 420 determines whether the end of the print job has been detected. If the end of the print job has been detected (YES in step S510), the control sequence of the image forming ends. If the end of the print job has not yet been detected (NO in step S510), the processing returns to step S509.

As described above, by using the heater 300 and the image heating device 200 according to the first exemplary embodiment, temperature rise can be reduced at the non-sheet-passing portion in a case where paper of a size smaller than the largest printable paper of the laser printer 100 is printed. Further, occurrence of uneven temperature at the gap portion of the plurality of heating blocks and uneven temperature of each of the heating blocks in the longitudinal direction of the heater 300 can be prevented. Further, safety of the image heating device 200 in the event of a failure can be enhanced.

Next, a second exemplary embodiment of the present invention will be described. The heater of the image heating device of the laser printer 100 is different from the heater according to the first exemplary embodiment. Descriptions of components similar to those of the first exemplary embodiment are not repeated. Unlike the first exemplary embodiment, the heating block of the heater according to the second exemplary embodiment includes one heat generating resistor.

Figure 6:
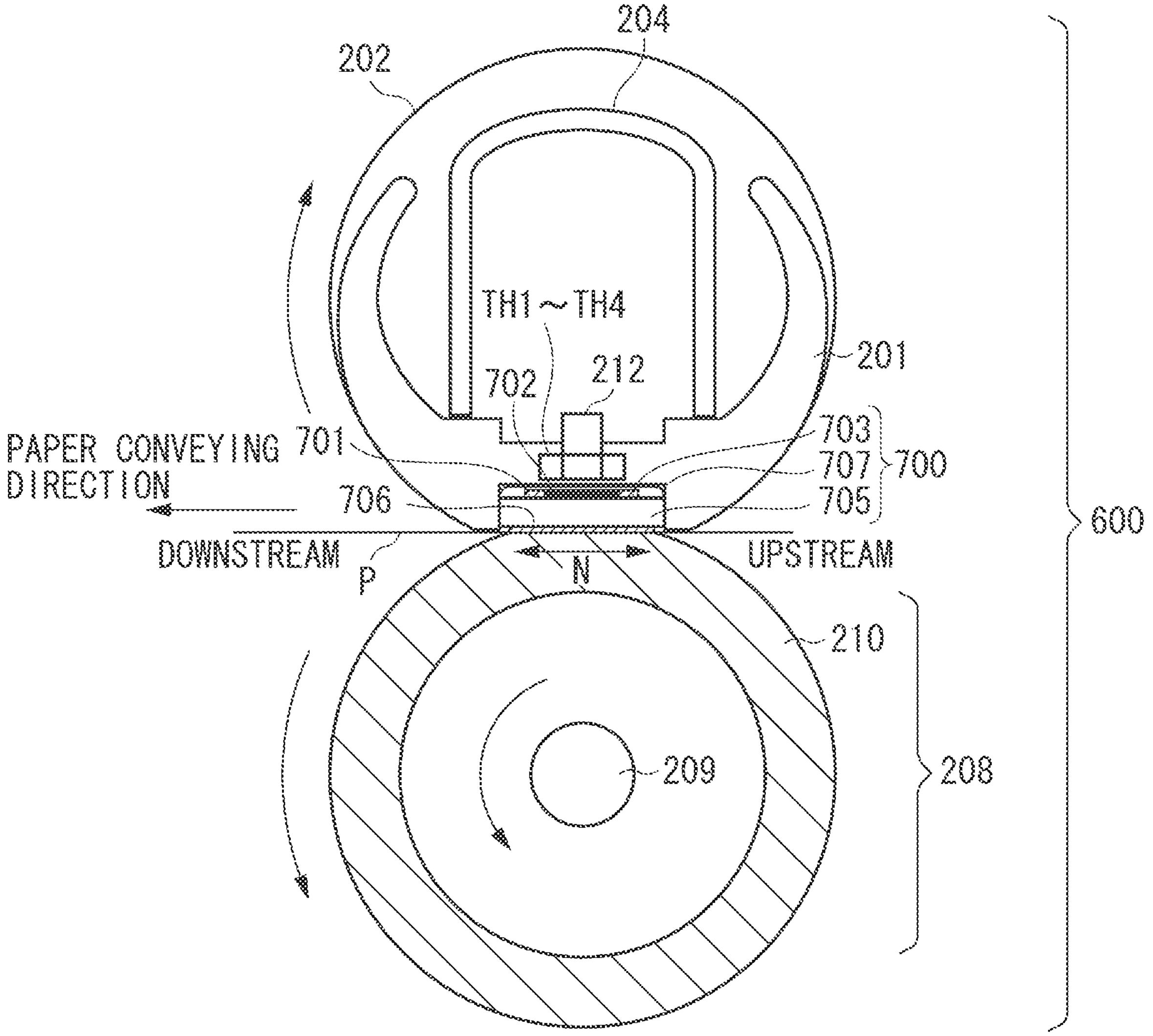
FIG. 6 is a cross-sectional view of the image heating device according to a second exemplary embodiment of the present invention.

An image heating device 600 illustrated in FIG. 6 includes a heater 700. The heat generating surface of the heater 700 is provided on the side opposite the surface of the heater that contacts the fixing film. The heater 700 includes a heater substrate 705 which is ceramic, a first conductive element 701, a second conductive element 703, and a heat generating resistor 702. The first conductive element 701 is provided on the heater substrate 705 along the longitudinal direction of the substrate. The second conductive element 703 is also provided on the heater substrate 705 along the longitudinal direction of the substrate but at a position different from the first conductive element 701 in the widthwise direction of the substrate. The heat generating resistor 702 is provided between the first conductive element 701 and the second conductive element 703 and has a positive temperature characteristic of resistance. Further, the heater 700 includes a surface protection layer 707 and a slide layer 706. The surface protection layer 707 covers the heat generating resistor 702, the first conductive element 701, and the second conductive element 703, and has an insulation property. According to the present embodiment, glass is used for the surface protection layer 707. The slide layer 706 contributes to realizing smoother sliding on the sliding surface of the heater 700.

Figure 7A:
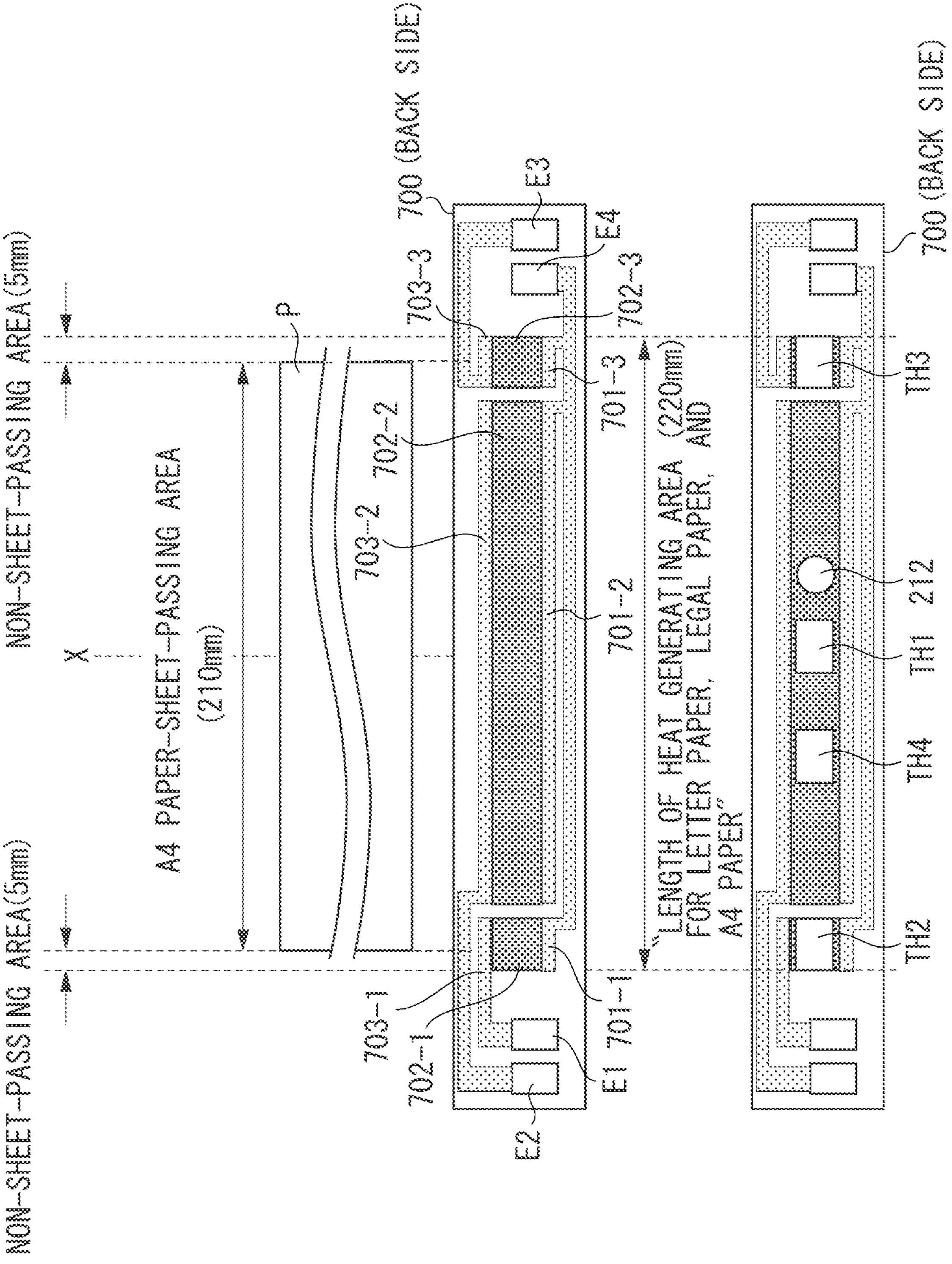
FIGS. 7A and 7B illustrate configurations of the heater according to the second exemplary embodiment.

FIG. 7A illustrates a configuration of the heater 700 according to the second exemplary embodiment. According to the second exemplary embodiment, the heater 700 includes three divided heating blocks 702-1, 702-2, and 702-3. Each of these heating blocks includes one heat generating resistor. Since other components and configuration of the present embodiment are similar to those of the first exemplary embodiment, the points different from the first exemplary embodiment are described.

The thermistors TH1 to TH4 and the safety element 212 contact the back side of the heater 700 as described above. According to the second exemplary embodiment, the safety element 212 contacts a sheet-passing area on the heater 700. The sheet-passing area is where a sheet of the smallest size which can be printed by the laser printer 100 passes. The portion where the safety element 212 contacts is a portion which is less affected by the temperature rise at the non-sheet-passing portion.

Next, temperature rise at the non-sheet-passing portion when power is supplied to all the three heating blocks 702-1, 702-2, and 702-3 will be described with reference to FIG. 7A. The center of the heat generating area is set as a reference position and A4 paper is fed by short edge feeding. The heater 700 has a heat generating area of a length of 220 mm which enables short edge feeding of Letter paper with a width of approximately 216 mm. If A4 paper with a paper width of 210 mm is fed to the heater 300 having a heat generating area of a length of 220 mm, a non-sheet-passing area of 5 mm is generated at both ends of the heat generating area. Although the power supplied to the heater 700 is controlled so that the temperature detected by the thermistor TH1 provided near the center of the sheet-passing portion is continuously the target temperature, since the heat generated at the non-sheet-passing portion is not removed by paper, the temperature of the non-sheet-passing portion is increased compared to the sheet-passing portion.

As illustrated in FIG. 7A, in printing A4-size paper, the sides of the recording material passes a part of the heating blocks 702-1 and 702-3, respectively at both ends of the heater 700. Thus, a non-sheet-passing portion of 5 mm is generated at both ends of the heating blocks 702-1 and 702-3. However, since the heat generating resistor is a PTC material, the electric resistance of the heat generating resistor at the non-sheet-passing portion is higher than the electric resistance of the heat generating resistor at the sheet-passing portion. Thus, the current flows less easily and the temperature rise at the non-sheet-passing portion can be reduced by the principle described with reference to FIG. 3A according to the first exemplary embodiment.

Figure 7B:
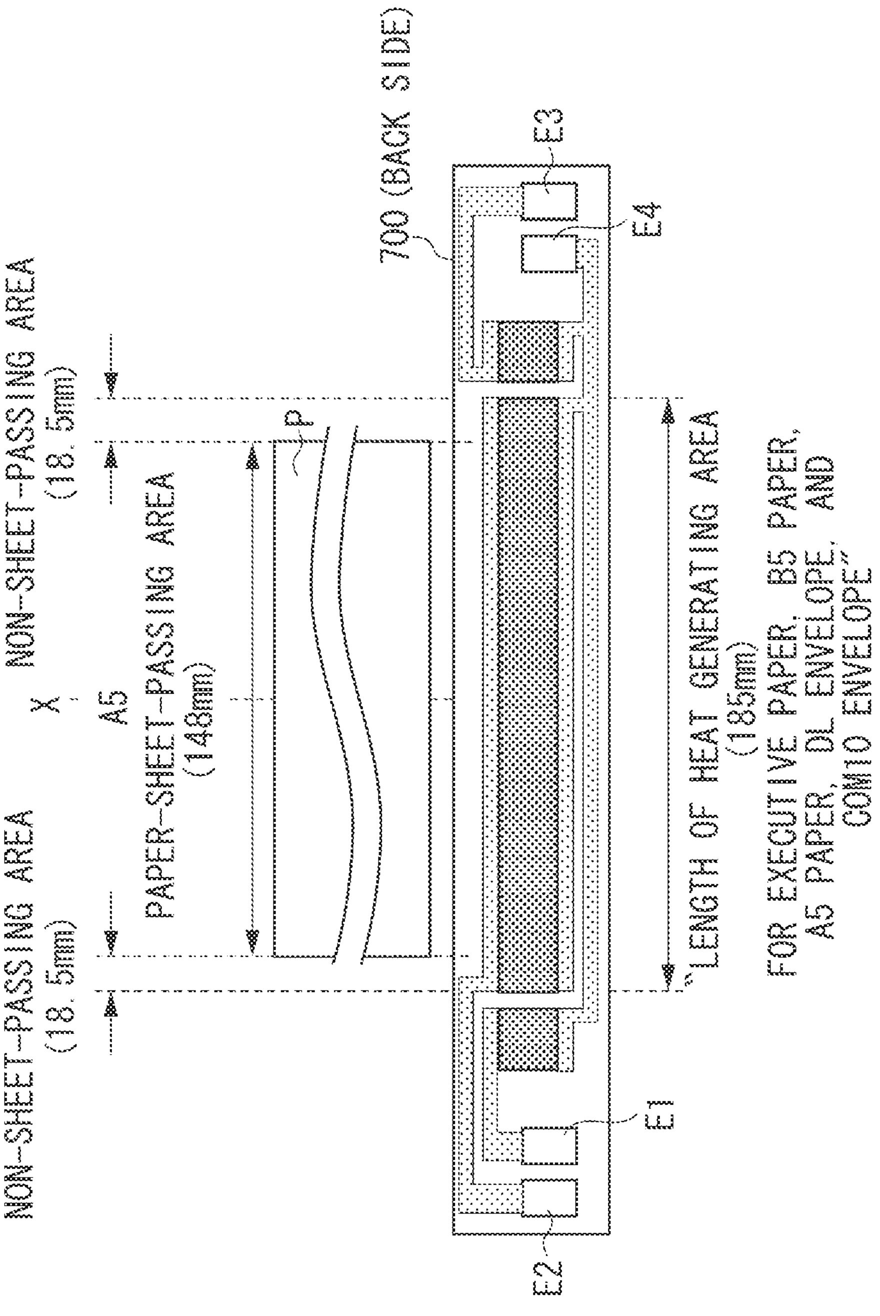

FIG. 7B illustrates the temperature rise at the non-sheet-passing portion when power is supplied only to the heating block 702-2 at the center portion of the heater 700. In FIG. 7B, the center of the heat generating area is set as the reference position and A5-size paper is fed by short edge feeding. The length of the heat generating area of the heating block 702-2 of the heater 700 is 185 mm which enables short edge feeding of Executive paper with a width of approximately 184 mm. If A5-size paper with a paper width of 148 mm is fed by short edge feeding to the heater 700 with the heat generating area of a length of 185 mm, a non-sheet-passing area of 18.5 mm is generated at each end of the heat generating area. The temperature rise in this non-sheet-passing area can be reduced by a principle same as the one described with reference to FIG. 3B according to the first exemplary embodiment.

Figure 8:
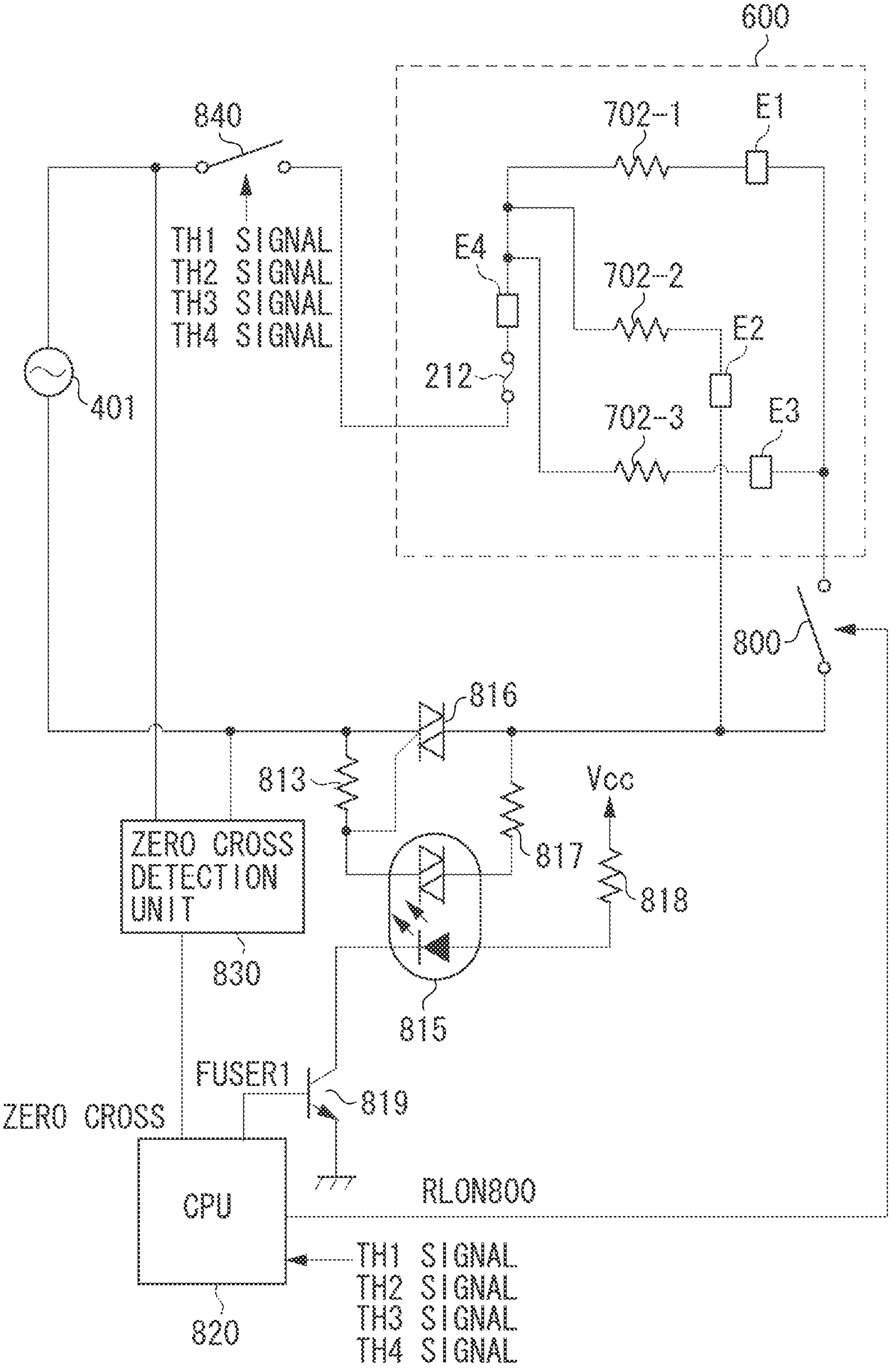
FIG. 8 is a heater control circuit diagram according to the second exemplary embodiment.

FIG. 8 is a heater control circuit diagram according to the second exemplary embodiment. The power supplied to the heater 700 is controlled by power on/off of a triac 816. In FIG. 4 according to the first exemplary embodiment, although two triacs are used in controlling the power supply to the heater, one triac (triac 816) and a relay 800 are used according to the second exemplary embodiment. The relay 800 operates according to an RLON800 signal output by a CPU 820.

If the triac 816 is energized when the relay 800 is turned off, power is supplied to the heating block 702-2. FIG. 7B illustrates the heater 700 in this state. If the triac 816 is energized when the relay 800 is turned on, power is supplied to the heating blocks 702-1, 702-2, and 702-3. FIG. 7A illustrates the heater 700 in this state.

According to the configuration described in the second exemplary embodiment, a case where power is supplied only to the heating blocks 702-1 and 702-3 at both ends of the heater 700 can be prevented regardless of the operating state of the relay 800 when, for example, a short-circuit failure or an open-circuit failure occurs. If power is supplied to the heating blocks 702-1 and 702-3 at both ends of the heater 700, power is also supplied to the heating block 702-2 at the center portion of the heater 700 regardless of the operating state of the relay 800. Thus, according to the present embodiment, the safety element 212 is provided to contact the sheet-passing area of the paper of the smallest size printable by the laser printer 100 which is less affected by the temperature rise at the non-sheet-passing portion. According to this arrangement, since the temperature of the safety element 212 is decreased in normal operation, the operation temperature of the safety element 212 can be set to a lower temperature. Accordingly, safety of the image heating device 600 can be enhanced.

Figure 9:
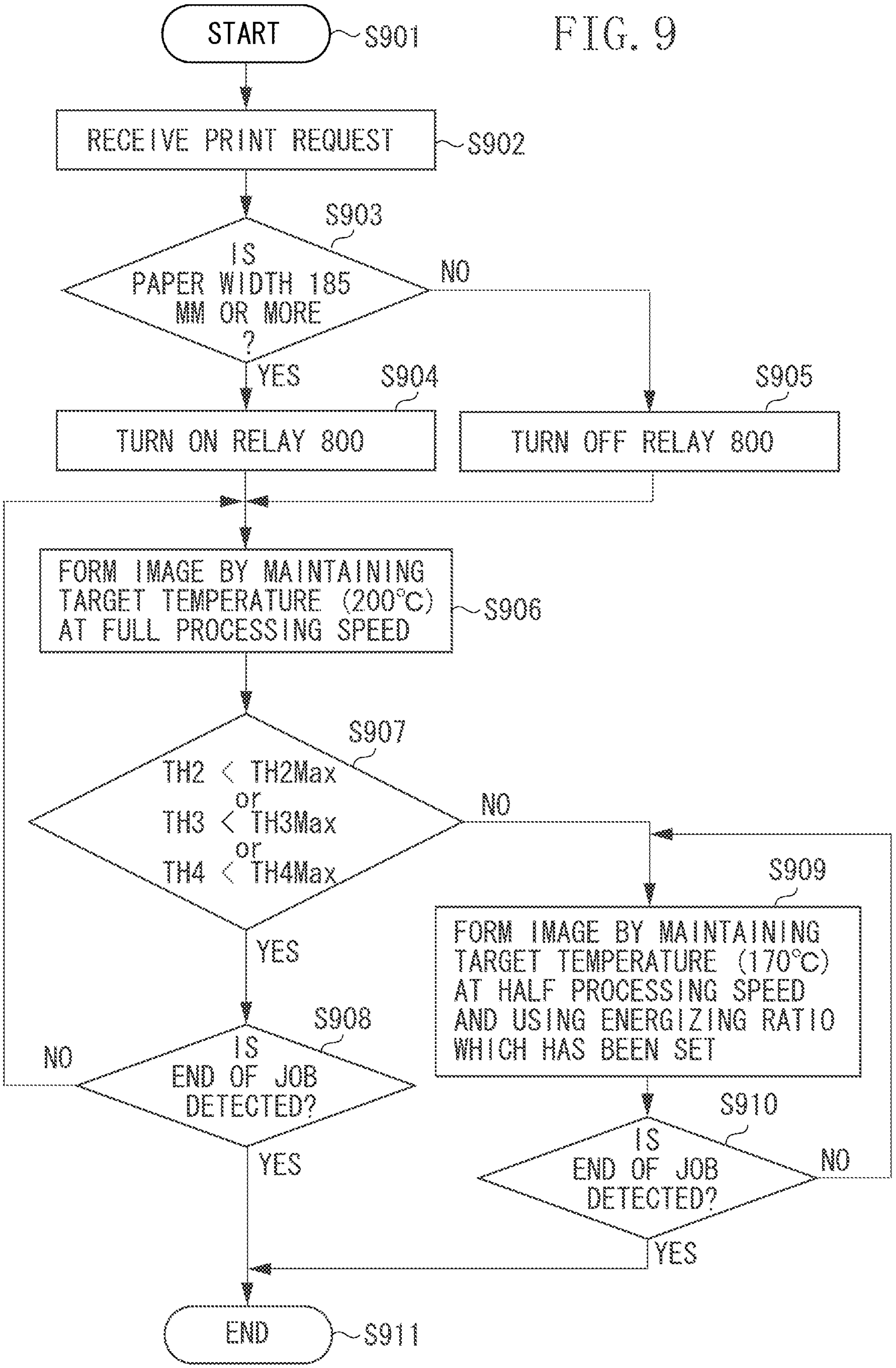
FIG. 9 is a flowchart illustrating the heater control according to the second exemplary embodiment.

FIG. 9 is a flowchart illustrating a control sequence of the image heating device 600 performed by the CPU 820. In step S902, the CPU 820 receives a print request. In step S903, the CPU 820 determines whether the width of the paper to be printed is 185 mm or more. According to the laser printer 100 of the present embodiment, the CPU 820 determines whether the paper is Letter paper, Legal paper, A4 paper, or non-standard paper with a width of 185 mm or more which is fed from the paper feeding tray 28. If the CPU 820 determines that the paper is such paper (YES in step S903), the processing proceeds to step S904. In step S904, the CPU 820 maintains the turn-on state of the relay 800 (state in FIG. 7A).

If the paper width is less than 185 mm (according to the present embodiment, Executive paper, B5 paper, A5 paper, DL envelope, Com10 envelope, or non-standard paper having a width less than 185 mm) (NO in step S903), the processing proceeds to step S905. In step S905, the CPU 820 maintains the turn-off state of the relay 800 (state in FIG. 7B).

In step S906, while maintaining the state of the relay 800 which has been set, the CPU 820 performs the image forming processing while setting the image forming process speed to full speed and controlling the heater 700 so that the temperature detected by the thermistor TH1 is continuously the target preset temperature (200° C.)

In step S907, the CPU 820 determines whether the temperature of the thermistor TH2 has exceeded the maximum temperature TH2Max of the thermistor TH2, the temperature of the thermistor TH3 has exceeded the maximum temperature TH3Max of the thermistor TH3, and the temperature of the thermistor TH4 has exceeded the maximum temperature TH4Max of the thermistor TH4. The maximum temperatures are set to the CPU 820 in advance. If the CPU 820 determines that any of the temperatures at the end portions of the heat generating area has exceeded the predetermined upper limit (the maximum temperatures TH2Max, TH3Max, or TH4Max) due to the increase in temperature of the non-sheet-passing portion, based on the signals of the thermistors TH2 to TH4 (NO in step S907), the processing proceeds to step S909. In step S909, the CPU 820 performs the image forming processing while setting the image forming process speed to half speed and controlling the heater so that the temperature detected by the thermistor TH1 is continuously the preset target temperature (170° C.)

In step S908, the CPU 420 determines whether the end of the print job has been detected. If the end of the print job has been detected (YES in step S908), the control sequence of the image forming ends. If the end of the print job has not yet been detected (NO in step S908), the processing returns to step S906. In step S910, the CPU 420 determines whether the end of the print job has been detected. If the end of the print job has been detected (YES in step S910), the control sequence of the image forming ends. If the end of the print job has not yet been detected (NO in step S910), the processing returns to step S909.

Figure 10A:
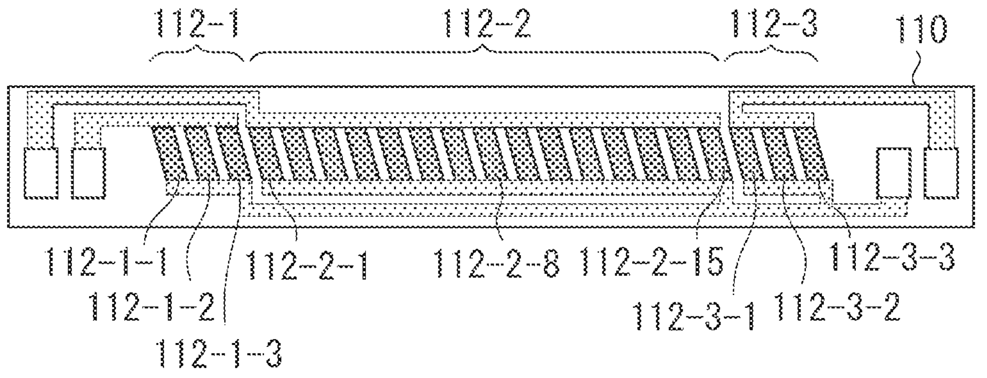
FIGS. 10A, 10B, and 10C illustrate alternate versions of the heater.
Figure 10B:
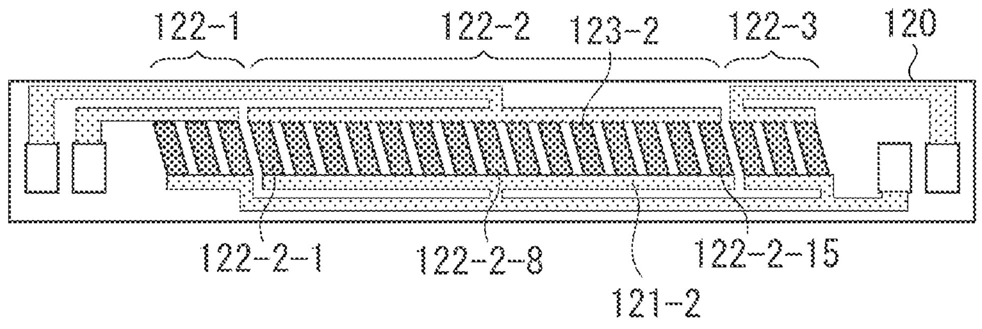
Figure 10C:
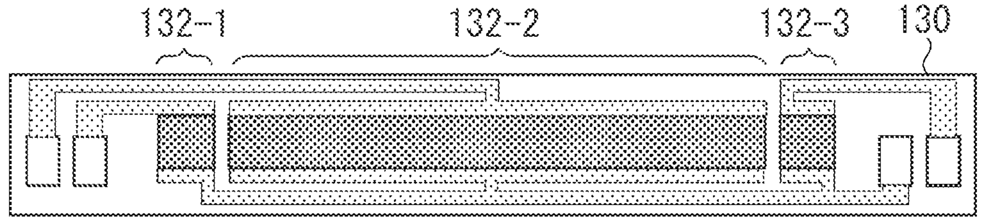

Next, a third exemplary embodiment of the present invention will be described. FIGS. 10A to 10C illustrate alternate versions of the heater. A heater 110 illustrated in FIG. 10A has a characteristic in that a heating block 112-2 at the center includes 15 heat generating resistors 112-2-1 to 112-2-15. In order to reduce the effect of voltage drop caused by the conductive element, the resistance values in the widthwise direction of the heat generating resistors, which are connected in parallel, are differentiated. In other words, the resistance value of each of the heat generating resistors 112-2-1 and 112-2-15 provided at the end in the longitudinal direction is higher than the resistance value of the heat generating resistor 112-2-8 provided at the center. Alternatively, the heat generating resistors may be arranged so that the element-to-element pitch of the heat generating resistors becomes greater toward each end of the heating block in the longitudinal direction. Further, both the resistance value and the pitch of the heat generating resistors can be adjusted to each other.

Further, regarding a heating block 112-1 at one end of the heater 110, the resistance value of each of heat generating resistors 112-1-1 and 112-1-3 provided at the end portions of the heating block is set to a higher value compared to the resistance value of a heat generating resistor 112-1-2 provided at the center portion of the heating block.

Similarly, regarding a heating block 112-3 at the other end of the heater 110, the resistance value of each of heat generating resistors 112-3-1 and 112-3-3 provided at the end portions of the heating block is set to a higher value compared to the resistance value of a heat generating resistor 112-3-2 provided at the center portion of the heating block. By using the heater 110 according to the present embodiment, heat can be more uniformly distributed in the longitudinal direction of the heater of the heating block. Regarding the heating blocks 112-1 and 112-3 at the end portions, the pitch of the heat generating resistors can be adjusted to each other just as the heat generating resistors of the heating block 112-2 at the center portion.

A heater 120 illustrated in FIG. 10B has a characteristic in that power is fed to a heating block 122-2 at the center portion of the heater 120 from a portion near the center of the heating blocks of each of a first conductive element 121-2 and a second conductive element 123-2. This power supplying method is hereinafter referred to as central power feeding. Thus, the effect of reducing the temperature rise at the non-sheet-passing portion can be enhanced as described with reference to FIG. 3B. In other words, the connection positions of the heating block 122-2 and the power supply lines which extend from the electrodes are arranged at the center of the first conductive element 121-2 and the center of the second conductive element 123-2 in the longitudinal direction.

The heating block 122-2 at the center portion of the heater 120 will be described. The heating block 122-2 is arranged between the first conductive element 121-2 and the second conductive element 123-2 and includes 15 heat generating resistors 122-2-1 to 122-2-15 arranged at regular intervals. The heat generating resistors 122-2-1 to 122-2-15 of the heating block 122-2, the conductive element 121-2, and the conductive element 123-2 are made of a PTC material.

If a temperature rise at each of the non-sheet-passing portions occurs when the heater 120 is in the state illustrated in FIG. 3B, the temperatures at the non-sheet-passing portions of the conductive element 121-2 and the conductive element 123-2 are increased as the temperature of the heat generating resistor at the non-sheet-passing portion of the heating block 122-2 is increased. If the temperatures of the conductive elements at the non-sheet-passing portions are increased, since the conductive elements have PTC characteristics, the resistance value of each of the conductive elements at the non-sheet-passing portions is increased. Accordingly, the electric current flows less easily. If the electric current that flows through each of the conductive elements at the non-sheet-passing portions is reduced, the current that flows through the heat generating resistor at the non-sheet-passing portion will also be reduced. Accordingly, the effect of reducing the temperature rise at each of the non-sheet-passing portions can be enhanced compared to a case where the temperature rise is controlled depending only on the effect of the PTC of the heat generating resistor.

Further, in order to correct the effect of the voltage drop due to the conductive element, regarding the resistance values in the widthwise direction of the heat generating resistors, which are connected in parallel, of the heating block at the center, the resistance value of each of the heat generating resistors 122-2-1 and 122-2-15 arranged at the end portion in the longitudinal direction is set to a value lower than the resistance value of the heat generating resistor 122-2-8 arranged at the center in the longitudinal direction. Alternatively, the parallelly-connected heat generating resistors of the heating block at the center portion are arranged so that the element-to-element pitch of the heat generating resistors becomes smaller toward each end of the heating block in the longitudinal direction. Since heating blocks 122-1 and 122-3 are similar to the heating blocks 112-1 and 112-3 of the heater 110 described above, their descriptions are not repeated.

A heater 130 illustrated in FIG. 10C performs the central power feeding to a heating block 132-2 at the center portion of the heater 130 similar to the heater 120. Accordingly, the effect of reducing the temperature rise at the non-sheet-passing portions when the heater 130 is in the state illustrated in FIG. 7B can be enhanced. Since heating blocks 132-1 and heating block 132-3 are similar to the heating blocks 702-1 and 702-3 of the heater 700 described above, their descriptions are not repeated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image heating device comprising:

a cylindrical film;

a heater arranged in an inner space of the film; and a roller configured to come into contact with an outer periphery of the film and form a nip portion to nip and convey a recording material together with the heater via the film, wherein the recording material on which an image is formed is nipped and conveyed by the nip portion and heated, wherein the heater includes:

an elongated substrate, a first heating block arranged in a central area of the substrate in a longitudinal direction of the substrate, a second heating block arranged closer to an end portion than the first heating block in the longitudinal direction of the substrate, wherein each of the first heating block and the second heating block includes a plurality of heat generating resistors electrically arranged side by side in the longitudinal direction of the substrate, a first electrode, arranged on the substrate, electrically connected to the plurality of heat generating resistors included in the first heating block, a second electrode, arranged on the substrate, electrically connected to the plurality of heat generating resistors included in the second heating block, and a third electrode, arranged on the substrate, electrically connected to the plurality of heat generating resistor included in the first heating block and the plurality of heat generating resistors included in the second heating block, wherein the first electrode, the second electrode, and the third electrode are configured to receive power supply from a power source by coming into contact with power supply terminals different from each other, and wherein the image heating device comprises:

a first temperature detecting element configured to detect a temperature and arranged in an area corresponding to the first heating block, and a second temperature detecting element configured to detect a temperature and arranged in an area corresponding to the second heating block.

2. The image heating device according to claim 1, wherein, in the longitudinal direction of the substrate, a length of the first heating block is greater than a length of the second heating block.

3. The image heating device according to claim 2, wherein the first heating block is arranged next to the second heating block on one side and the length of the first heating block is twice or more than the length of the second heating block.

4. The image heating device according to claim 1, wherein a number of the plurality of heat generating resistors included in the first heating block is greater than a number of heat generating resistors included in the second heating block.

5. The image heating device according to claim 4, wherein the number of the plurality of heat generating resistors included in the first heating block is twice or more than the number of the plurality of heat generating resistors included in the second heating block.

6. The image heating device according to claim 1, wherein the plurality of heat generating resistors included in each of the first heating block and the second heating block, the first electrode, the second electrode, and the third electrode are arranged only on the same surface of the substrate.

7. The image heating device according to claim 1, wherein the heater further includes a third heating block arranged closer to an end portion than the first heating block in the longitudinal direction, the third heating block including a plurality of heat generating resistors electrically arranged side by side in the longitudinal direction, and wherein the second heating block is arranged next to the first heating block on one side of the first heating block, and the third heating block is arranged next to the first heating block on another side of the first heating block.

8. The image heating device according to claim 7, wherein the heater is changeable between a first state in which power is supplied to the plurality of heat generating resistors included in the first heating block and a second state in which power is supplied to the plurality of heat generating resistors included in the first heating block, the plurality of heat generating resistors included in the second heating block, and the plurality of heat generating resistors included in the third heating block.

9. The image heating device according to claim 1, wherein a characteristic of the plurality of heat generating resistors included in the first heating block is a first positive temperature characteristic of resistance.

10. The image heating device according to claim 9, wherein a characteristic of the plurality of heat generating resistors included in the second heating block is a second positive temperature characteristic of resistance.

11. The image heating device according to claim 1, further comprising:

a control unit configured to control power to be supplied to the plurality of heat generating resistors included in the first heating block and the plurality of heat generating resistors included in the second heating block;

a first triac arranged in a power supply path between a power supply and the plurality of heat generating resistors included in the first heating block and configured to change a state between a state in which power is supplied to the plurality of heat generating resistors included in the first heating block and a state in which power is not supplied to the plurality of heat generating resistors included in the first heating block in response to a control signal from the control unit; and a second triac arranged in a power supply path between the power supply and the plurality of heat generating resistors included in the second heating block and configured to change a state between a state in which power is supplied to the plurality of heat generating resistors included in the second heating block and a state in which power is not supplied to the plurality of heat generating resistors included in the second heating block in response to a control signal from the control unit.

12. The image heating device according to claim 1, wherein the first temperature detecting element and the second temperature detecting element are thermistors which contact a surface of the substrate opposite to a surface on which the plurality of heat generating resistors included in the first heating block and the second heating block is arranged.

13. The image heating device according to claim 1, wherein the first electrode and the second electrode are arranged in one side of the substrate in the longitudinal direction and the third electrode is arranged in the other side of the substrate in the longitudinal direction.

14. The image heating device according to claim 1, wherein the plurality of heat generating resistors included in each of the first heating block and the second heating block extend in a widthwise direction of the substrate.

15. The image heating device according to claim 1, wherein the first heating block includes two conductive elements and the second heating block includes two conductive elements, and wherein the two conductive elements included in the first heating block extend along the longitudinal direction at the same positions in a widthwise direction of the substrate as the two conductive elements included in the second heating block.

16. An image forming apparatus comprising:

an image forming unit configured to form an image on a recording material; and a fixing unit configured to fix the image formed on the recording material to the recording material, wherein the fixing unit includes:

(i) a cylindrical film, (ii) a heater arranged in an inner space of the film, and (iii) a roller configured to come into contact with an outer periphery of the film and form a nip portion to nip and convey the recording material together with the heater via the cylindrical film, wherein the recording material on which the image is formed is nipped and conveyed by the nip portion and heated so that the image is fixed to the recording material, wherein the heater includes:

an elongated substrate, a first heating block arranged in a central area of the substrate in a longitudinal direction of the substrate, a second heating block arranged closer to an end portion than the first heating block in the longitudinal direction of the substrate, wherein each of the first heating block and the second heating block includes a plurality of heat generating resistors electrically arranged side by side in the longitudinal direction of the substrate, a first electrode, arranged on the substrate, electrically connected to the plurality of heat generating resistors included in the first heating block, a second electrode, arranged on the substrate, electrically connected to the plurality of heat generating resistors included in the second heating block, and a third electrode, arranged on the substrate, electrically connected to the plurality of heat generating resistor included in the first heating block and the plurality of heat generating resistor included in the second heating block, wherein the first electrode, the second electrode, and the third electrode are configured to receive power supply from a power source by coming into contact with power supply terminals different from each other, and wherein the fixing unit comprises:

a first temperature detecting element configured to detect a temperature and arranged in an area corresponding to the first heating block, and a second temperature detecting element configured to detect a temperature and arranged in an area corresponding to the second heating block.

17. The image forming apparatus according to claim 16, further comprising a control unit configured to control power to be supplied to the plurality of heat generating resistors included in the first heating block and the plurality of heat generating resistors included in the second heating block, wherein the control unit controls a state to change between a first state in which power is supplied to the plurality of heat generating resistors included in the first heating block and a second state in which power is supplied to the plurality of heat generating resistors included in the first heating block and the plurality of heat generating resistors included in the second heating block.

18. The image forming apparatus according to claim 16, wherein the heater further includes a third heating block arranged closer to an end portion the first heating block in the longitudinal direction, the third heating block including a plurality of heat generating resistors electrically arranged side by side in the longitudinal direction, wherein the second heating block is arranged next to the first heating block on one side of the first heating block, and the third heating block is arranged next to the first heating block on another side of the first heating block.

19. The image forming apparatus according to claim 18, further comprising a control unit configured to control power to be supplied to the plurality of heat generating resistors included in the first heating block, the plurality of heat generating resistors included in the second heating block, and the plurality of heat generating resistors included in the third heating block, wherein the control unit controls a state to change between a first state in which power is supplied to the plurality of heat generating resistors included in the first heating block and a second state in which power is supplied to the plurality of heat generating resistors included in the first heating block, the plurality of heat generating resistors included in the second heating block, and the plurality of heat generating resistors included in the third heating block.

* * * * *